Aug. 6, 1957  P. SCHELLER ET AL  2,801,546
MULTI-SPEED DRIVING MECHANISM FOR PHONOGRAPHS
Filed May 14, 1954

Inventors
Paul Scheller
and
Walter Oldenburg

United States Patent Office 2,801,546
Patented Aug. 6, 1957

2,801,546

MULTI-SPEED DRIVING MECHANISM FOR PHONOGRAPHS

Paul Scheller, Wuppertal-Barmen, and Walter Oldenburg, Kiel, Germany, assignors to Electroacustic G. m. b. H., Kiel, Germany Application May 14, 1954, Serial No. 429,879

6 Claims. (Cl. 74—200)

The present invention relates to phonographs, and is especially directed to a driving mechanism for machines of this type provided with novel means for adjusting the rotation of the turntable for the records at a plurality of different speeds.

More particularly, the invention relates to a speed change mechanism in which between the inner flange of the turntable for the records and the multi-stepped driving shaft of the motor an intermediate wheel is interposed which is designed as a friction wheel, and which can selectively be caused to engage one of the plurality of stepped portions of the driving shaft.

One object of the invention is to devise a simple and reliable construction for the portion of the mechanism by means of which the change-over of the intermediate wheel from one stepped portion of the driving shaft to another is effected, as well as for the means by which the intermediate wheel is secured in operating position.

A second object of the invention is to provide a three-speed mechanism of simplest construction for the customary speeds of the turntable of 33, 45 and 78 revolutions per minute.

Another object of the invention is to devise the construction of the change-over mechanism in such a way that the intermediate wheel or friction wheel, when it is in a change-over position between two operating positions, or when the phonograph is not working, is not in contact with the stepped end of the motor driven driving shaft. Such a construction has the additional advantage that it affords shifting the friction wheel from a stepped portion of smaller diameter to a stepped portion of larger diameter.

Still another object of the invention is to devise the actuating means of the change-over mechanism and the supporting means of the friction wheel which cooperate with the actuating means, in such a way that these means are enabled to simultaneously serve as supporting means for the friction wheel when the latter is in operating position.

Additional features and advantages of the invention will be understood from the following detailed description taken in connection with the accompanying drawings, forming a part of this specification and showing two embodiments of the invention by way of illustration. However, we wish to say that the invention is not confined to any strict conformity with the showing of the drawings, but may be changed or modified, so long as such changes or modifications do not materially depart from the salient features of the invention as expressed in the appended claims.

Figure 1:
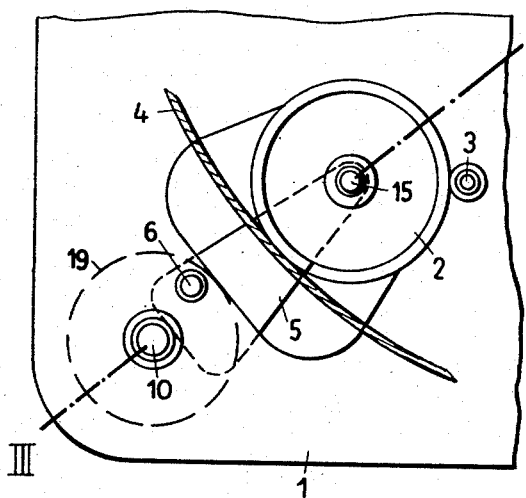
Fig. 1 is a fractional top view of a phonograph provided with change-over mechanism, showing the friction wheel and its supporting means.

Referring now to the drawings in detail, the reference numeral 1 designates the mounting plate. The intermediate wheel 2 is shown in Fig. 1 in one of its operating positions in which it simultaneously engages the inner surface of the flange 4 of the turntable for the records on the one hand, and the stepped portion of largest diameter of the driving shaft 3 on the other hand. The intermediate wheel 2 is arranged on a supporting member 5 which is rotatably supported by a pin 6 fastened to the mounting plate 1. The shaft 15 of the intermediate wheel 2 passes through an elongated opening 20 in the supporting member 5, so that the wheel 2 can freely move in longitudinal direction of its supporting member 5, and thus can adjust itself in proper working position between the stepped portion of the motor driven shaft 3 and the inner surface of the flange 4 of the turntable. A control shaft or adjusting shaft 10 is rotatably fastened to the mounting plate 1 and carries a cam 9 provided with an operating edge 8, adapted for cooperation with a pin 7 fastened to the supporting member 5. When the control shaft 10, and consequently also the cam 9, are rotated in anti-clockwise direction as indicated by the arrow 11 (Fig. 2), the supporting member 5 and the intermediate wheel 2 are rotated in the same direction (toward the left), as indicated by the arrow 12. As a result, the wheel 2 is forced out of engagement with the stepped portion of the shaft 3. The working positions of the mechanism, in which the intermediate wheel 2 simultaneously engages the stepped portion of the shaft 3 and the inner surface of the flange 4 of the turntable, are determined by the inwardly curved portions or recesses of the operating edge 8. To permit shifting the intermediate wheel 2 from one stepped portion of the shaft 3 to the next following stepped portion, the supporting member 5 is axially displaceable on pin 6. For displacing the supporting member 5, the control shaft 10 is provided with a shifting or lifting edge 13, which is devised as a screw thread, and which cooperates with an extension 14 of the supporting member 5. When a knob 19, mounted on the upper end of the adjusting shaft 10, is turned in anti-clockwise direction, the supporting member 5 is lifted and simultaneously rotated first anti-clockwise and then clockwise into the next following operating position, in which the wheel 2 engages the next following stepped portion (in this case the middle or center portion) of the shaft 3. By continued rotation of knob 19, the wheel 2 can be moved into its uppermost operating position, in which it engages the uppermost stepped portion of the shaft 3.

From an inspection of the drawings it will be seen that at levels positioned between two operating positions the wheel 2 is rotated away from the stepped portion of the shaft 3 and therefore not in contact with the latter.

Figure 4:
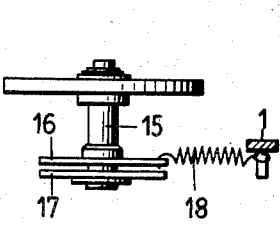
Fig. 4 is a detail view of the friction wheel and of its supporting shaft and tensioning spring.
Figure 5:
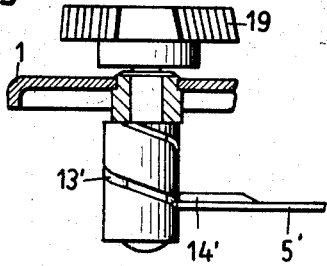
Figs. 5 and 6 are detail views of a modified form of construction of the change-over mechanism.
Figure 6:
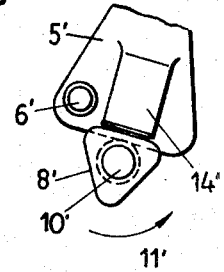

Fig. 4 shows how the wheel 2 and its shaft 15 are supported on the supporting member 5. Mounted on the shaft 15 are two disks 16 and 17 between which the supporting member 5 is located. Fastened to the disk 16 is a tensioning spring 18 which has its other end fastened to the mounting plate 1. The tensioning spring 18 causes the wheel 2, when the latter is in one of its operating positions, to rest against a stepped portion of the shaft 3 and against the flange 4 of the turntable.

Figure 2:
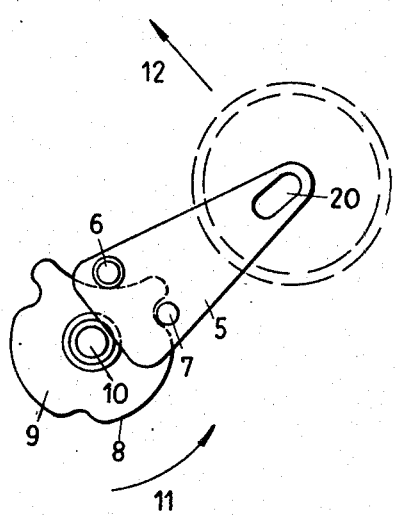
Fig. 2 is a top view of the actuating means causing the swinging movement of the friction wheel and its supporting means.
Figure 3:
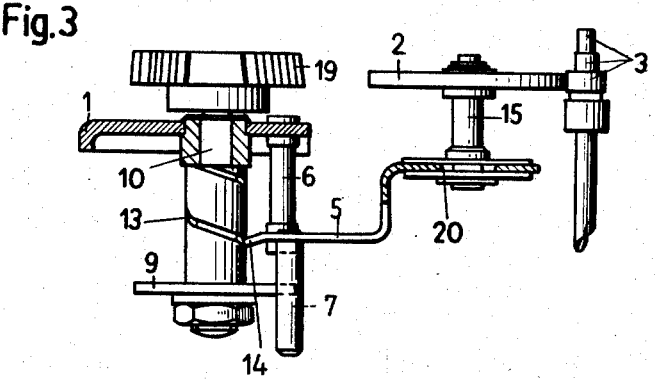
Fig. 3 is a side elevation, partly in section on line III—III of Fig. 1.

In the embodiment shown in Figs. 2 and 3, the construction is so devised that the lifting edge 13 and the operating edge 8 of the cam 9 separately perform their functions.

In the modified form of construction illustrated in Figs.

5 and 6, the functions of the lifting edge 13 and of the operating edge 8 are jointly performed by one structural element. Here, the outer cross-section 8' of the lifting edge 13' is of substantially triangular shape. When the wheel 2 is in one of its operating positions, the shoulder 14' of the supporting member 5' rests against one of the three sides of the triangular lifting edge, whereby the supporting member 5' is supported at the pin 6' for rotation about the latter and for shifting in longitudinal direction.

When in this form of construction the adjusting shaft 10' is rotated in anti-clockwise direction, as indicated by the arrow 11', the rounded-off portion of the operating edge 8' is moved into contact with the shoulder 14', whereby the supporting member 5' is caused to swing toward the left in a similar way as shown in Fig. 2. When the rotation of the shaft 10' continues, the next following one of the three sides of the triangular edge 8' is caused to rest against the shoulder 14', whereby the supporting member 5' is pulled back into engagement with the edge 8' by the tensioning spring 18.

What we claim as new and desire to secure by Letters Patent of the United States is:

1. In a multi-speed driving mechanism for phonographs the combination comprising, a circumferentially flanged turntable for records, a motor driven driving shaft having a stepped end, a single intermediate wheel of the friction wheel type operative to simultaneously engage when in operating position a stepped portion of the stepped end of said driving shaft and the flange of said turntable, supporting means for said friction wheel rotatably and shiftably mounted and operative to swing said friction wheel out of engagement with said stepped portion of said driving shaft and with said flange of said turntable and to simultaneously shift said friction wheel from one stepped portion to another stepped portion; unitary manually operable adjusting means directly coupled to said supporting means and operable to actuate said supporting means to perform said swinging- and simultaneous shifting movement, and tensioning means secured to said supporting means and operative to return said friction wheel to operating position and to cause said friction wheel when in operating position to engage a stepped portion of said driving shaft and said flange of said turntable.

2. In a multi-speed driving mechanism for phonographs the combination comprising, a circumferentially flanged turntable for records, a motor driven driving shaft having a stepped end, a single intermediate wheel of the friction wheel type operative to simultaneously engage when in operating position a stepped portion of the stepped end of said driving shaft and the flange of said turntable, supporting means for said friction wheel rotatably and shiftably mounted and operative to swing said friction wheel horizontally out of engagement with said stepped portion of said driving shaft and with said flange of said turntable and to simultaneously shift said friction wheel vertically from one stepped portion to another stepped portion; unitary manually operable adjusting means directly coupled to said supporting means and operable to actuate said supporting means to perform said swinging- and simultaneous shifting movement when required, said manually operable adjusting means consisting of a manually rotatable adjusting shaft, a pin extending vertically from said supporting means, a cam fixed to said adjusting shaft and having its operating edge cooperative with said pin for swinging said supporting means in the horizontal direction, and a shifting edge integral with said adjusting shaft and cooperative with an edge portion of said supporting means for shifting said supporting means in the vertical direction; and tensioning means secured to said supporting means and operative to return said friction wheel to operating position at the end of a swinging and shifting movement of said supporting means and to cause said friction wheel when in operating position to engage a stepped portion of said driving shaft and said flange of said turntable.

3. A multi-speed driving mechanism for phonographs as specified in claim 2, in which said operating edge of said cam is of circular formation and provided with a plurality of inwardly curved recesses for engagement of said pin and in which said shifting edge of said adjusting shaft is of screw-thread-like formation.

4. A multi-speed driving mechanism for phonographs as specified in claim 1, in which said manually operable adjusting means consist of a manually rotatable adjusting shaft, a combined swinging- and shifting edge for said supporting means integral with said adjusting shaft and operable to effect, in cooperation with a shoulder portion provided at said supporting means, the simultaneous swinging of said supporting means in the horizontal direction and said shifting of said supporting means in the vertical direction, said combined swinging- and shifting edge being of screw-thread-like formation and having an outer cross-section of substantially triangular shape.

5. A multi-speed driving mechanism for phonographs as specified in claim 2, in which said supporting means of said friction wheel comprises a lever provided at one end with an elongated opening; and a shaft on which said friction wheel is rotatably mounted, said shaft being shiftably supported in said elongated opening.

6. A multi-speed driving mechanism for phonographs as specified in claim 1, in which said driving shaft is provided with a three-speed driving end.

References Cited in the file of this patent

UNITED STATES PATENTS

| | | |
|---|---|---|
| 2,438,264 | Bender | Mar. 23, 1948 |
| 2,584,580 | Hardy | Feb. 5, 1952 |
| 2,621,527 | Guest, et al | Dec. 16, 1952 |